United States Patent
Williams (10) Patent No.: US 8,200,834 B2
(45) Date of Patent: Jun. 12, 2012

(54) METHOD AND SYSTEM FOR SECURE SERVER-BASED SESSION MANAGEMENT USING SINGLE-USE HTTP COOKIES

(75) Inventor: Ronald B. Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/213,539

(22) Filed: Aug. 19, 2011

(65) Prior Publication Data
US 2011/0307622 A1 Dec. 15, 2011

Related U.S. Application Data

(63) Continuation of application No. 09/896,195, filed on Jun. 30, 2001, now Pat. No. 8,005,965.

(51) Int. Cl.
*G06F 15/16* (2006.01)
(52) U.S. Cl. .......................... 709/229; 709/224; 709/227
(58) Field of Classification Search .................. 709/225, 709/228, 229, 224, 227
See application file for complete search history.

(56) References Cited

U.S. PATENT DOCUMENTS

| | | | |
|---|---|---|---|
| 5,542,046 A | 7/1996 | Carlson et al. | |
| 5,805,803 A | 9/1998 | Birrell et al. | |
| 5,815,664 A | 9/1998 | Asano | |
| 5,845,070 A | 12/1998 | Ikudome | |
| 5,987,520 A | 11/1999 | Libby et al. | |
| 5,996,086 A | 11/1999 | Delaney et al. | |
| 6,041,357 A | 3/2000 | Kunzelman et al. | |
| 6,092,196 A | 7/2000 | Reiche | |
| 6,182,142 B1 | 1/2001 | Win et al. | |
| 6,611,923 B1 | 8/2003 | Mutalik et al. | |
| 6,662,228 B1 | 12/2003 | Limsico | |
| 7,039,699 B1 | 5/2006 | Narin et al. | |
| 2002/0041605 A1 | 4/2002 | Benussi et al. | |
| 2002/0143861 A1 | 10/2002 | Greene et al. | |

OTHER PUBLICATIONS

Netscape Corporation, Persistent Client State—HTTP Cookies, http://www.netscape.com/newsref/std/cookie_spec.html, Jan. 1999.
Kristol, HTTP State Management Mechanism, RFC 2965, http://iettorg/rfc/rfc2965.txt, Oct. 2000.

*Primary Examiner* — Ramy M Osman
(74) *Attorney, Agent, or Firm* — Hamilton & Terrile, LLP; Gary W. Hamilton (57) ABSTRACT

A methodology for providing secure session management is presented. After a single-use token has been issued to a client, it presents the token, and the server may identify the client based upon the presented token. However, the token may be used only once without being refreshed prior to re-use, thereby causing the token to be essentially reissued upon each use. The token comprises a session identifier that allows the issuer of the token to perform session management with respect to the receiving entity. Tokens can be classified into two types: domain tokens and service tokens. Domain tokens represent a client identity to a secure domain, and service tokens represent a client identity to a specific service. A domain token may be used with any service within a domain that recognizes the domain token, but a service token is specific to the service from which it was obtained.

20 Claims, 6 Drawing Sheets

METHOD AND SYSTEM FOR SECURE SERVER-BASED SESSION MANAGEMENT USING SINGLE-USE HTTP COOKIES

This application is a continuation of application Ser. No. 09/896,195, filed Jun. 30, 2001 now U.S. Pat. No. 8,005,965, which is incorporated herein by reference in its entirety.

BACKGROUND OF THE INVENTION

1. Field of the Invention

The present invention relates to an improved data processing system and, in particular, to a method and apparatus for multicomputer data transferring. Still more particularly, the present invention provides a method and apparatus for computer-to-computer session management.

2. Description of Related Art

Information technology (IT) systems and the Internet have fueled commercial activity. While IT systems have significant benefits, at the same time they pose potential security threats from unauthorized third parties. Indeed, the lack of security in modern IT systems has emerged as a threat to the integrity of global computer networks.

To deal with this problem, IT systems provide a number of known services: data authentication, data confidentiality, entity authentication, and entity authorization. Data authentication typically consists of two sub-services: data integrity and data origin authentication. A data integrity service is used to convince a receiver of some item of given data that the data was not changed during transit, and data origin authentication proves to the receiver the identity of the real sender. Data confidentiality protects against disclosure of data during transmission. Entity authentication provides a system with proof that a certain entity is who they claim to be.

Authorization is the act of determining whether an authenticated entity has the right to execute an action. Authorization and authentication thus are dual services. To be able to provide authorization, it is necessary to determine who the entity is, e.g., by entity authentication. Authorization, in general, consists of two separate stages: the provision of privileges to a particular entity, e.g., authorization credentials, and the use of these privileges by the receiving entity in combination with access decision rules at a protected service or a protected resource to determine if access should be granted to the entity.

The client-side applications of many IT systems are now based on a Web browser application architecture because of its adaptability to multiple uses. Through the standard Hypertext Transfer Protocol (HTTP), a user of a browser application on a client machine can gain access to resources or services on any HTTP-enabled server. If the user at the client desires to access a protected resource or a protected service at the server that can only be accessed by an authenticated and authorized user, however, there must be some process to authenticate and authorize the user/client.

As is well-known, a cookie is a data item that is stored on a client by a server through a particular user's web browser. When a user of a client machine visits a Web server, the server may return a cookie to the user's browser to be stored in a client-side cookie cache. When a cookie is "set", i.e. stored, as part of an HTTP transaction, it may include the path, i.e. domain, for which the cookie is valid, the cookie's name and value, and other optional attributes, such as the cookie's expiration date. In most cases, the client browser automatically stores the cookie data by default, sometimes without giving the user the option or the knowledge of it being done. When the user revisits the server at some later point in time, the cookie is sent with the request, thereby identifying the user to the server.

A typical cookie can be quite convenient for identifying a user or client to a server, but depending on the type of resources and services provided by a server, a cookie introduces security vulnerabilities into client-server communications. In some prior art solutions, identification data is forwarded within a cookie when the client browser issues a request for a protected resource to the server that set the cookie. Such an approach can be insecure because an attacker that obtains possession of the cookie might be able to gain user authorization to access the protected resource. In other words, an insecure implementation of a cookie might equate proof of possession with proof of identity. In fact, some servers equate possession of a cookie with authentication of the identity of the client/user that possesses the cookie, thereby relying on the cookie as a short-cut for identifying a user or client by other means even though cookies may be stolen and then used maliciously. More insidiously, some cookie implementations also contain the username and password required by a user to authenticate into a system. This is particularly dangerous because if this information is stolen, a malicious user can authenticate to a system using other means, such as a login application, and thereby appear to be the user that is being impersonated. The malicious user could thereafter have his own cookies set by the server at the malicious user's client machine.

Cookies can be either persistent cookies, which are stored on disk, or memory cookies, which are stored in memory. Persistent cookies reside in a client file or cookie cache, such as "cookies.txt", after the client browser is closed and are available during the next browser session. Memory cookies disappear when the browser is shut down. However, both types of cookies can be dangerous since both types of cookies can be stolen by malicious code, such as a JavaScript that has a Trojan horse, i.e. benign code that hides malicious code, through interception of network traffic, or by a malicious server in the cookie's intended domain of use. Although both types of cookies are vulnerable to theft, persistent cookies are a bigger threat because they can be stolen from the cookie file. As a consequence, these prior art schemes are highly susceptible to replay attacks wherein one who acquires a cookie can simply assert it to gain access to a protected resource or protected service.

As mentioned above, applications in many IT systems are increasingly using Web-based or Internet-based standards, such as HTTP. However, HTTP is a stateless protocol—each client request to a server establishes a connection between the client and the server, but according to a strict interpretation of the HTTP standard, the connection is considered closed when the server responds to the client request. The client may immediately generate another request to the server, but the subsequent request is considered to establish another connection. Obviously, the most common interactions between a client and a server require multiple requests that are related to each other and that the server needs to know are related to one another. In other words, the server needs to maintain a session context for each client through which it determines that a request from a client is related to a previous request and requires a response based on this temporal relationship. Hence, most servers need a session management mechanism.

Due to the round-trip nature of a cookie being issued from a server to a user or client and then being returned to the server at a later point in time, cookies provide a degree of state to HTTP. Therefore, cookies are frequently used for session management purposes within the server that issued the cookie.

Although session management within the server is facilitated or enabled by the use of cookies, the use of cookies for secure session management has been historically problematic because of the client-side vulnerabilities that were discussed above with respect to authentication. Since cookies are supported by all commercial Web browsers and servers, cookies are frequently used for detailed session management, such as tracking user movement within Web sites. From a security standpoint, however, a computational environment that employs cookies to enable secure access to protected resources and/or services while storing cookies in cookie caches creates vulnerabilities that are exploitable via the acquisition of cookies by malicious persons.

Other alternative security methodologies rely heavily on client-side functionality, but most suffer from the fundamentally uncontrolled nature of most client-based systems. The infrastructure required to support these client systems and to maintain a secure trust chain among their components is considered to be unwieldy in many environments.

Therefore, it would be advantageous to have a lightweight security solution for ongoing session management in a Web environment. It would be particularly advantageous to have a method and system for cookie-based secure session management that is server-based and is compliant with existing Internet protocols.

SUMMARY OF THE INVENTION

The present invention is a method, system, apparatus, or computer program product for providing secure session management using single-use tokens, also termed single-use cookies. After a single-use token has been issued to an entity, the entity may present the token to a service, and the receiving entity may identify the presenting entity based upon the presented token. However, the token may be used only once, after which the token must be updated or refreshed prior to re-use, thereby causing the token to be essentially reissued upon each use. The token comprises a session identifier of some sort that allows the issuer of the token to perform session management with respect to the receiving entity.

Tokens can be classified into two types: domain tokens and service tokens. Domain tokens represent a client identity to a secure domain, and service tokens represent a client identity to a specific service, but both domain tokens and service tokens can be implemented as a cookie in accordance with common protocols for obtaining and setting cookies for a client browser. A domain token may be used with any service within a domain that recognizes the domain token in order to obtain a service token, but a service token is specific to the service from which it was obtained; a service token may not be used with any services other than the one that created it.

A client attempts to login to a domain through a first server, which challenges the client to provide authentication data for identifying the client or the user of the client. After the first server has authenticated the client or the user of the client, the first server generates a single-use domain token that is associated with the client or the user of the client and returns the single-use domain token to the client. The login request may have originated as a redirect response from a second server; if so, then the first server redirects the client to the second server.

At some point in time, a client sends to the second server a request to access a protected resource. If the client already possesses a single-use domain token, then the single-use domain token is sent to the second server along with the request to access the protected resource. If the second server does not also receive a single-use domain token, then the client is redirected to the first server to complete the domain login process.

If the client already possesses a single-use service token, then the single-use service token is also sent to the second server along with the request to access the protected resource. If not, then the second server attempts to issue a single-use service token for the client or the user of the client, and the single-use service token is sent to the client along with the response to the request to access the protected resource. If a single-use service token is also received with the request to access the protected resource, the single-use service token is validated prior to generating the response to the request to access the protected resource.

This summary outlines some of the features of the present invention which are illustrative of the invention, and a fuller understanding of the invention may be had by referring to the Detailed Description.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

DETAILED DESCRIPTION OF THE INVENTION

The present invention is directed to a system and a methodology for secure client-server session management. Servers that implement the present invention may be dispersed throughout a network. As background, a typical organization of hardware and software components within a distributed data processing system is described prior to describing the present invention in more detail.

Figure 1A:
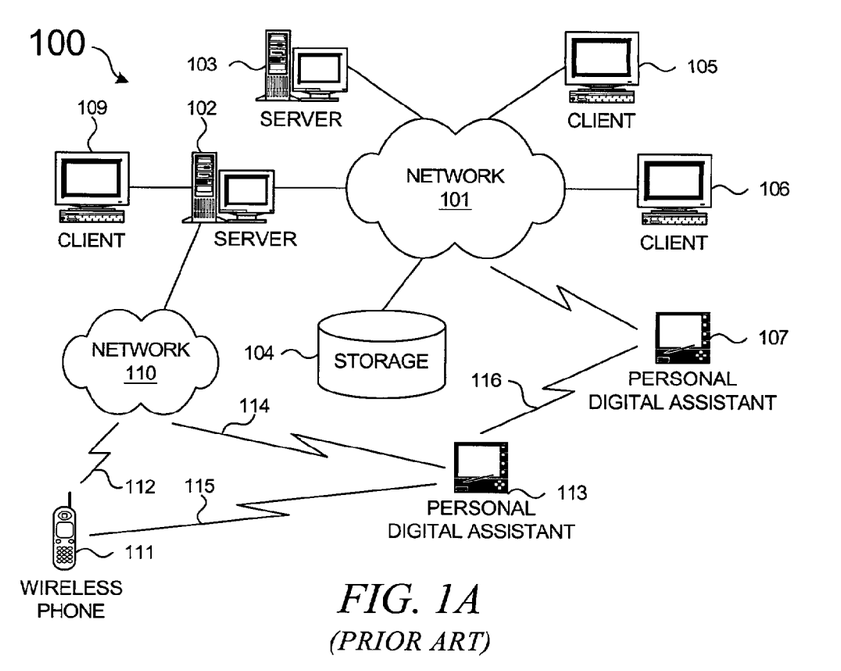
FIG. 1A depicts a typical network of data processing systems, each of which may implement the present invention.

With reference now to the figures, FIG. 1A depicts a typical network of data processing systems, each of which may contain and/or operate the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 107 via wireless communication link 116.

The present invention could be implemented on a variety of hardware platforms; FIG. 1A is intended as an example of a heterogeneous computing environment and not as an architectural limitation for the present invention.

Figure 1B:
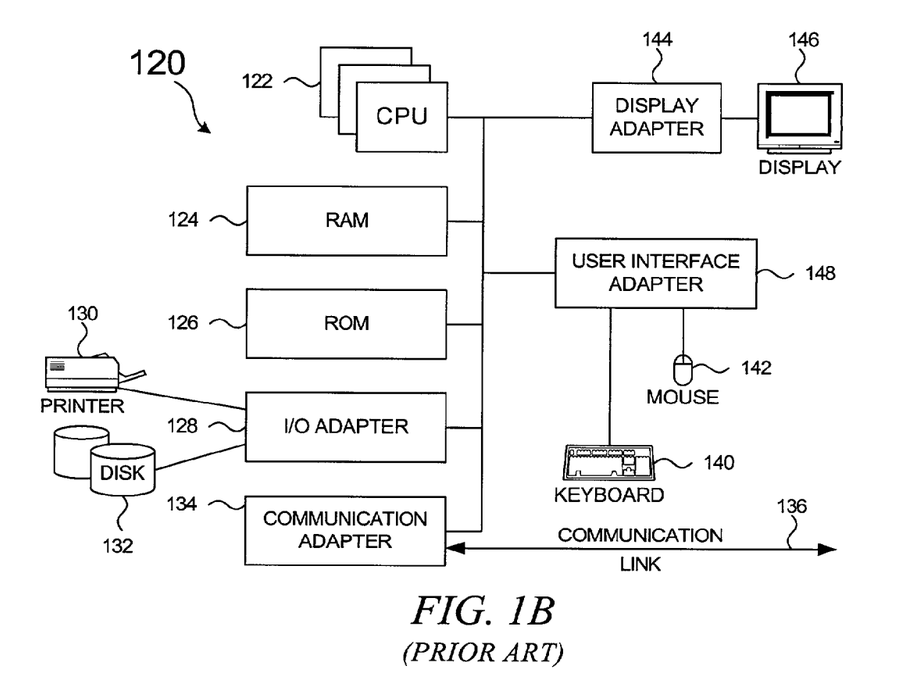
FIG. 1B illustrates a Web-based environment in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as a audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, including a digital signal processor (DSP) and other types of special purpose processors, and one or more types of volatile and non-volatile memory. Other peripheral devices may be used in addition to or in place of the hardware depicted in FIG. 1B. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files.

Figure 1C:
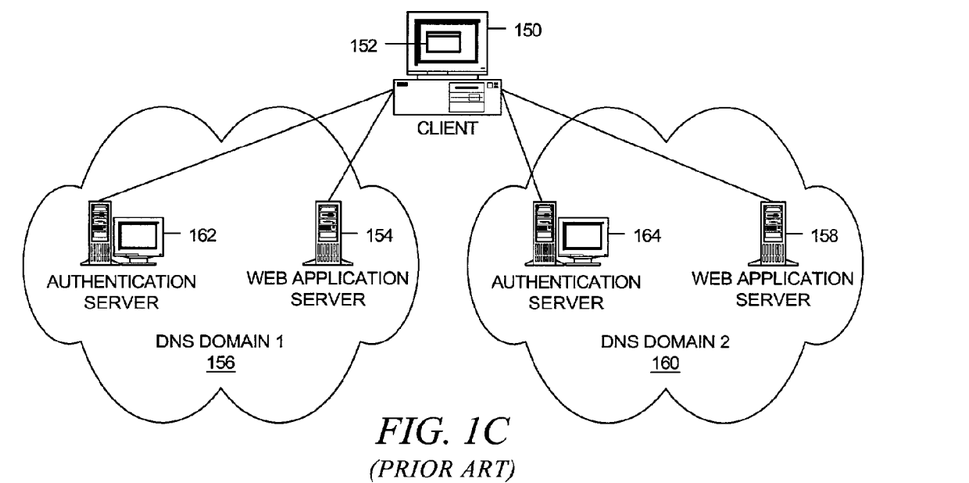
FIG. 1C is a data flow diagram illustrating a prior art process that may be used when a client attempts to access a protected resource.

With reference now to FIG. 1C, a network diagram illustrates a more specific, yet generic, Web-based environment in which the present invention may be implemented. In this environment, a user of a browser 152 at client 150 desires to access a protected resource or protected service on web application server 154 in DNS domain 156 or on web application server 158 in DNS domain 160 through a network. The computer network may be the Internet, an intranet, or other network, as shown in FIG. 1A, and the server may be a Web application server, a server application, a servlet process, or the like.

A service may be considered to be a type of resource, and a resource may be provided via a service; hence, service and resource may be used interchangeably. A protected resource is a resource, such as an application, an object, a document, a page, a file, executable code, or other computational resource, communication-type resource, etc., that is only retrieved or accessed if the requesting client or user has been both authenticated and authorized. A protected resource, which is typically identified by a Uniform Resource Locator (URL), or more generally, a Uniform Resource Identifier (URI), can only be accessed by an authenticated and authorized user. Each DNS domain may have an associated authentication server, shown as server 162 and server 164. Typically, once the user is authenticated by the authentication server, a cookie may be set and stored in a cookie cache in the browser.

As noted above, the present invention may be used within a variety of networks and hardware/software platforms. More particularly, though, the present invention provides a methodology for secure client-server session management using cookies. The term "cookie", "token", or "identifier" may be used interchangeably in relation to the present invention, as is described below with respect to the remaining figures.

Figure 2A:
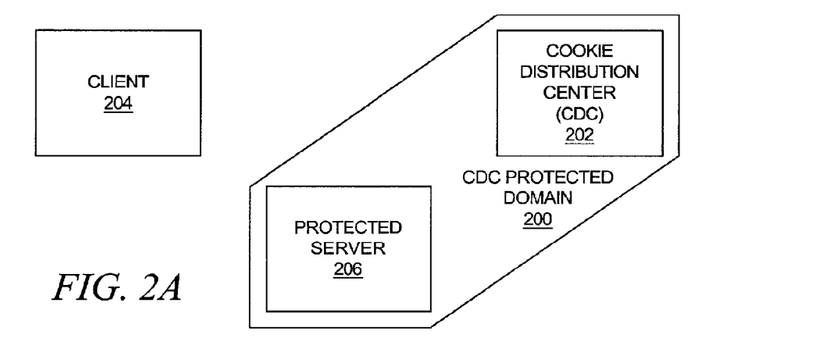
FIG. 2A is a block diagram depicting the primary entities that are involved in an environment that implements the present invention.

With reference now to FIG. 2A, a block diagram shows the primary entities that are involved in an environment that implements the present invention. Cookie Distribution Center (CDC) 202, provides authentication, secure session management, and authorization credential acquisition services to protected servers in the CDC environment, i.e. domain 200. In FIG. 2A, client 204 represents a browser session of a user at a client machine. To initiate a secure session within CDC-protected domain 200, the client authenticates to the CDC and, if successful, receives a single-use domain cookie that represents the client's identity for operations within domain 200, which is equivalent to stating that the domain cookie represents the client's identity for operations with respect to the CDC alone, as will be explained in more detail further below.

Protected server 206 hosts protected services and protected resources that are sought by clients. In other words, protected server 206 may be viewed as a protected resource to client 204. To the CDC, however, protected server 206 is an authenticated client because protected server 206 also uses the CDC concurrently with client 204, as is described below in more detail; to the protected server, the CDC is an authenticating server.

It should be noted that the data format of any of the messages between the entities in the network, such as requests and responses, may vary depending upon system implementation in accordance with proprietary or standard formats. It should also be noted that the CDC, the protected server, and/or a client may be hosted on the same physical machine.

Tokens can be classified into two types: domain tokens and service tokens. Domain tokens represent a client identity to a secure domain, and service tokens represent a client identity to a specific service, but both domain tokens and service tokens can be implemented as a cookie in accordance with the protocols for obtaining and setting cookies for a client browser. A domain token may be used with any service within a domain that recognizes the domain token, but a service token is specific to the service from which it was obtained; a service token may not be used with any services other than the one that created it.

The data format of any tokens may vary depending upon system implementation in accordance with proprietary or standard formats. For example, a token may also include an optional timestamp for publicly indicating and limiting the useful lifetime of the token. A token may be formatted as a binary string, as an encoded ASCII string, or in some other interpretable format. A token may be optionally formatted in accordance with various standards, such as PKCS (Public Key Cryptography Standards) specifications for enveloped data. In other words, in addition to comprising hashed user-specified identity information, any information within a token may be encrypted to hide the information so as to limit the risk that it might be misappropriated. It should be noted either that the entire token can be an encrypted data item or that individual data items can be encrypted and then placed within the token.

Protected server 206 is able to respond to service requests from client 204, i.e. protected server 206 establishes a session context in which it will provide service to client 204. However, protected server 206 initially generates a request to CDC 202 and establishes a session context between protected server 206 and CDC 202. A protected server must be known and trusted by the CDC before the protected server can be provided service by the CDC. To that end, protected server 206 has established its own session context with CDC 202 prior to a client receiving access to a protected resource at the protected server. In addition, the protected server may have established a shared session key with which to protect communications between itself and the CDC; the entities within the network may share or synchronize cryptographic keys as appropriate in accordance with many well-known manners in the prior art.

Figure 2B:
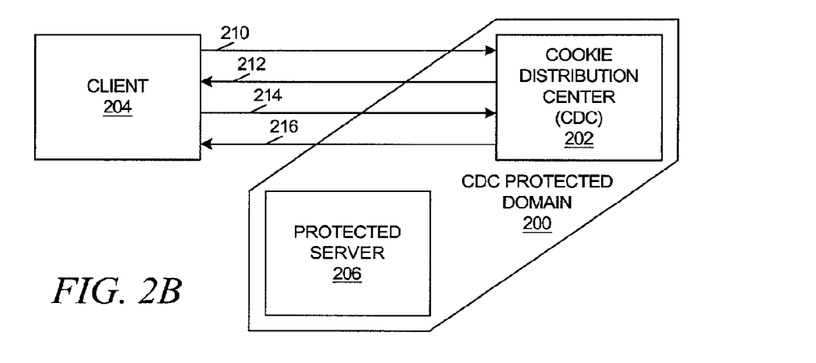
FIG. 2B is a block diagram depicting a domain authentication process between a client and a Cookie Distribution Center (CDC)

With reference now to FIG. 2B, a block diagram depicts a domain authentication process between a client and a CDC. As a first step, client 204 sends a login request 210 to CDC 202. Communications between client 204 and CDC 202 may be protected through the use of cryptographic keys as appropriate for a selected level of security.

Assuming that the present invention is being implemented in a lightweight manner, the login request may be a simple request to access a markup language document that represents a login Web page. In this manner, the client does not require a login application to have been previously installed, and the present invention can rely on a browser application on the client machine to support the login process. In response to the login request, CDC 202 sends a login applet 212 and a randomly generated nonce value to client 204. The login applet comprises cryptographic functionality to create a message authentication code (MAC) from the client to the server. In general, a nonce value is a server-supplied value, such as a hexadecimal string, that is returned by the receiving client in its response to the server in some manner. With the support of the browser application, the login applet would challenge the user at the client for a user identifier and a user password, and the login applet would generate the MAC by cryptographically combining or hashing the user-supplied information and the nonce value in an appropriate manner.

Client 204 then sends MAC 214 to CDC 202, which attempts to authenticate the client response. If the authentication is unsuccessful, then a failure message may be returned to the client and displayed for the user. However, assuming that the authentication is successful, then a single-use domain token 216, i.e. a domain cookie, is returned to the client, and an appropriate message may be returned and displayed for the user. The browser application would store the single-use domain token for subsequent use as necessary for accessing protected resources, and the domain authentication process would be complete.

As noted previously, at some point in time, protected server 206 is required to complete a successful authentication process in order to establish a session with CDC 202 before the protected server can process service requests from a client. Rather than operating the protected server in a lightweight manner with respect to the CDC, a login application may be installed on the protected server, and the login application provides the cryptographic functionality that is required for generating the responses to the authentication challenges from the CDC. In that case, a protected server would receive a nonce value from the CDC but would not receive a login applet as part of the response from the CDC. For example, the login application may automatically perform its domain authentication process with the CDC during its initialization procedures at startup. In a manner similar to the client, if the protected server is successfully authenticated, then the protected server also receives a single-use domain token that is to be used with subsequent communications to the CDC.

Figure 2C:
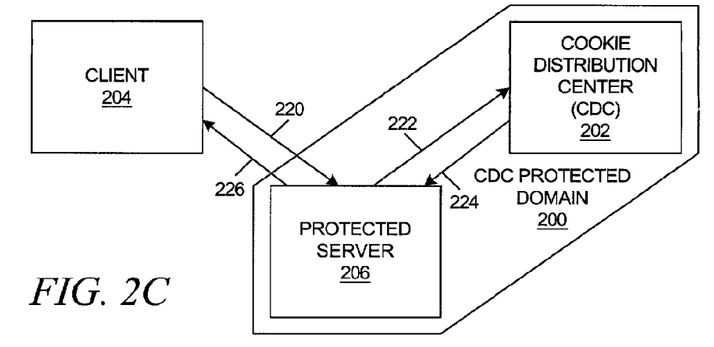
FIG. 2C is a block diagram depicting a service authentication process between a client and a protected server.

With reference now to FIG. 2C, a block diagram depicts a service authentication process between a client and a protected server. As a first step, client 204 sends a request 220 for a protected service/resource to protected server 206. Because the protected server is within the same domain 200 as CDC 202, the client's browser application sends any cookies associated with the domain in the request or along with the request in some form of association between the domain token and the request; in this case, the client sends single-use domain token 216 that was received from CDC 202 during its domain authentication process as described above with respect to FIG. 2B.

In response to receiving the request from the client, protected server 206 then sends user/client authorization credential request 222 to CDC 202. The client authorization credential request comprises the client's single-use domain token and may include other secondary client authentication information, such as the client's IP address, which assumes that the protected server has the ability to obtain a client machine's IP address independent of the token itself. In order to identify itself to the CDC, the protected server also sends the protected server's single-use domain token to the CDC.

Communications between protected server 206 and CDC 202 may be protected through the use of cryptographic keys as appropriate for a selected level of security, such as the session keys that were previously mentioned. The protected server may use well-known authorization schemes for obtain the client authorization credentials, such as the AuthAPI™ specification, which is the Open Group Authorization API. The protected server can use the client authorization credentials to bind an identity to the client's session, to create a service token for the client, and to represent the client in access control decision requests via an AuthAPI™ product.

In response to receiving the client credential request, the CDC validates both the client's single-use domain token and the protected server's single-use domain token and then generates the client credentials, which might contain various types of information, such as authorization information for the client or user for indicating the types of resources that the client or the user may access. In general, the client credentials may comprise any user-specific or client-specific authorization information that is managed outside of a protected server but that may be used by a protected server to perform access control decisions with respect to service requests to access protected resources.

In addition, the CDC refreshes the client's single-use domain token and the protected server's single-use domain token. As should be apparent from the terminology of the present invention, the single-use domain token can be asserted and used only once by its owning entity, i.e. the entity with which the domain token is associated. After a single-use domain token has been used, it cannot be re-used without being refreshed or updated by its issuing entity so that it may be used again. Essentially, a token is reissued upon each use. Asserting a stale or invalid token would result in a failed operation and optionally other security measures, such as tracking the originating address of the asserting entity.

If the domain tokens have been successfully validated, then the CDC returns the newly generated client credentials and the refreshed domain tokens to the protected server in an appropriate response message 224. Otherwise, the response indicates some type of failure upon which the protected server may take further action.

Protected server 206 then stores the client credentials and the protected server's refreshed single-use domain token. After other possible processing steps for client request 220, such as establishing a session context for client 204, protected server 206 then generates, i.e. issues, a single-use service token, which is expected to be asserted by the client along with each request that the client sends to the protected server in order to identify the client to the protected server. The token also includes session information in some manner for allowing the protected server to identify the client's session context when a next request is received from the client within the established session. For example, a session ID can be issued by the protected server and inserted in the service token; the session ID is subsequently matched to the client's session context when received by the protected server. Preferably, the session information is a session key contained in the data field of the cookie. Protected server 206 then returns to client 204 a newly generated service response message 226, which comprises (or is otherwise associated with) an updated single-use domain token from the CDC, a single-use service token from the protected server, and any other information that fulfills the request from the client.

Figure 2D:
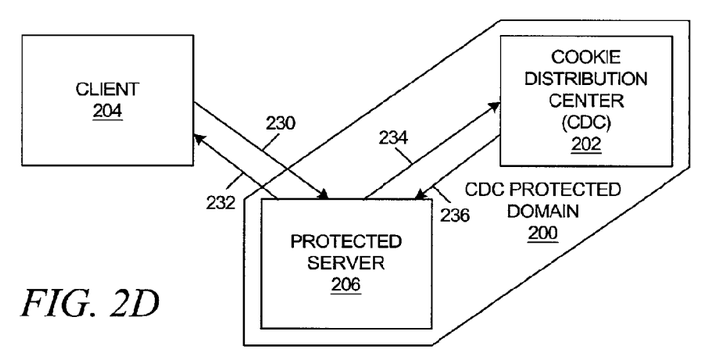
FIG. 2D is a block diagram depicting subsequent processing of a request from a client to a protected server.

With reference now to FIG. 2D, a block diagram depicts subsequent processing of a request from a client to a protected server. As a first step, client 204 sends a request 230 for a protected service/resource to protected server 206. Given the destination domain of the request, the client's browser application sends any cookies associated with the domain along with the request. In this case, assuming that the client has received refreshed tokens from the protected server in response to a previous request, the client sends the refreshed single-use domain token for domain 200 that was received from protected server 206 during the previous request as described above with respect to FIG. 2C. In addition, the client also sends a single-use service token that was possibly newly generated during the previous request as described above with respect to FIG. 2C.

In response, the protected server uses the session ID in the service token to match the previously established session context with the client, and the protected server processes the client's request and also refreshes the single-use service token. The protected server then generates and returns service response message 232 for the client that comprises the refreshed single-use service token in addition to any other information that fulfills the client's request. Hence, any subsequent request from a client would comprise a refreshed single-use service token rather than a newly generated service token.

In a preferred embodiment, prior to returning a response to client 204, protected server 206 also refreshes the client's domain token by forwarding it to CDC 202; in order to do so, protected server 206 also sends its domain token along with the client's domain token in request message 234. After CDC 202 validates and refreshes the tokens, they are returned in message 236.

In a manner similar to that described above for the single-use domain token, a single-use service token can be asserted only once by its owning entity, i.e. the entity with which the service token is associated. After a single-use service token has been used, it cannot be re-used without being refreshed or updated by its issuing entity so that it may be used again. Essentially, a token is reissued upon each use. Asserting a stale or invalid token would result in a failed operation and optionally other security measures, such as tracking the originating address of the asserting entity.

If a request from a client to a protected server does not include a single-use domain token, the protected server can redirect the client to the CDC to perform a login process in a manner similar to that described above with respect to FIG. 2B. The protected server can indicate a return URI to which the client should be subsequently redirected after successfully completing the login process. Hence, request 210 and response 216 may contain information for redirecting the client as appropriate. Assuming that the HTTP protocol is being used for communication between the entities shown in FIG. 2D, the protected server may use an HTTP Redirect message. An HTTP Redirect allows a server to respond to a client request with instructions to load a resource at a different location, and in response, most browsers will automatically request the new resource in response to a redirect. When the browser receives the HTTP Redirect, the browser issues a new HTTP Request using the redirected URI provided in the HTTP Redirect.

Figure 3A:
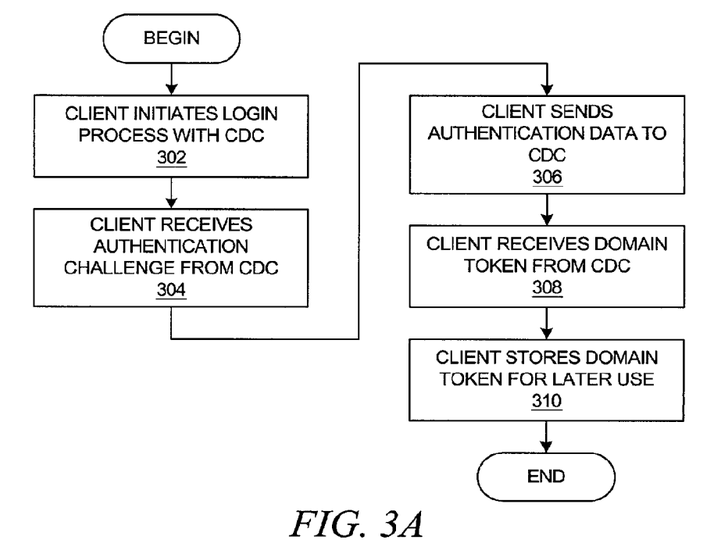
FIG. 3A is a flowchart depicting some of the steps in a process through a client obtains an identity token from a CDC in accordance with a preferred embodiment of the present invention.

With reference now to FIG. 3A, a flowchart depicts some of the steps in a process through which a client obtains a domain token from a Cookie Distribution Center (CDC) in accordance with a preferred embodiment of the present invention. The process begins with the client initiating a login process with a CDC (step 302), after which the client receives an authentication challenge from the CDC (step 304). In response, the client then sends user-specific or client-specific authentication data to the CDC in a secure manner (step 306), and the client subsequently receives a domain token, i.e. domain cookie, from the CDC (step 308). The client stores the domain token (step 310) until it is required to be asserted as proof-of-identity at some later point in time, and the process is complete.

Figure 3B:
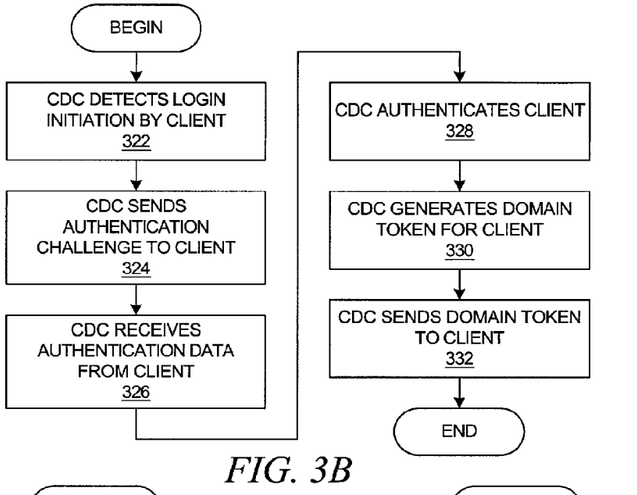
FIG. 3B is a flowchart depicting some of the steps in a process through which a CDC issues an identity token to a client in accordance with a preferred embodiment of the present invention.

With reference now to FIG. 3B, a flowchart depicts some of the steps in a process through which a CDC issues a domain token to a client in accordance with a preferred embodiment of the present invention. The process begins with the CDC detecting the initiation of a login sequence by a client in some manner (step 322), and the CDC responds by sending an authentication challenge to the client (step 324). The CDC then receives user-specific or client-specific authentication data from the client (step 326). The CDC authenticates the client or user (step 328) by processing the authentication data to determine whether or not the client or the user that is asserting itself has properly established its identity, and if so, then the CDC generates a domain token for the client or user (step 330), which might include registering the domain token within a database. The CDC then sends the domain token to the client (step 332), and the process is complete.

Figure 3C:
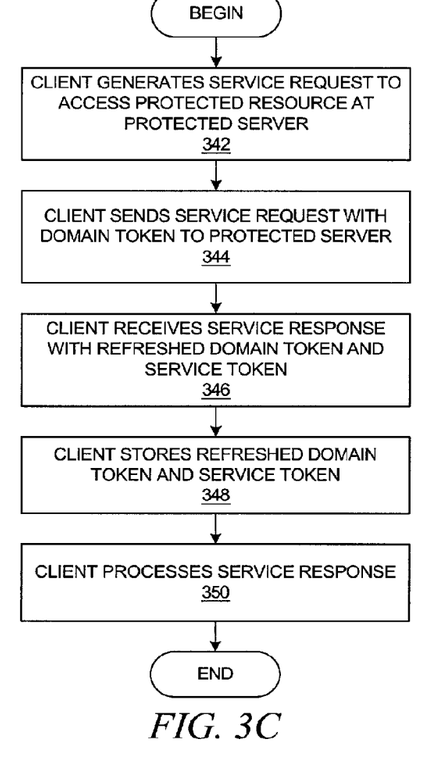
FIG. 3C is a flowchart depicting some of the steps in a process through which a client initially obtains access to a protected resource in accordance with a preferred embodiment of the present invention.

With reference now to FIG. 3C, a flowchart depicts some of the steps in a process through which a client initially obtains access to a protected resource in accordance with a preferred embodiment of the present invention. The process begins with the client generating a service request to access a protected resource at a protected server (step 342). The client then sends the service request to the protected server along with any tokens that are associated with the domain containing the protected server, which in this case would include the client's domain token that was received from the CDC (step 344). At some later point in time, the client receives from the protected server a service response along with a refreshed domain token and a newly issued service token, which contains some form of a session identifier (step 346). The client stores the tokens that it has received from the protected server (step 348), e.g., within a cookie cache. The client then processes any data that has been received as part of the service response (step 350), and the process is complete.

Figure 3D:
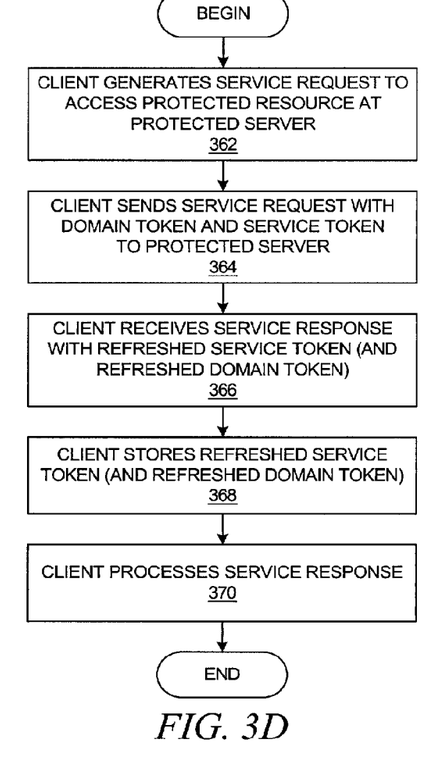
FIG. 3D is a flowchart depicting some of the steps in a process through which a client obtains access to a protected resource after already receiving a service token in accordance with a preferred embodiment of the present invention.

With reference now to FIG. 3D, a flowchart depicts some of the steps in a process through which a client obtains access to a protected resource after already receiving a service token in accordance with a preferred embodiment of the present invention. The process shown in FIG. 3D is similar to that shown in FIG. 3C, but FIG. 3C represents the actions of a client while initiating a session with a protected server, whereas FIG. 3D represents the actions of a client after a session has been established with a protected server.

The process begins with the client generating a service request to access a protected resource at a protected server (step 362). The client then sends the service request to the protected server along with any tokens that are associated with the domain containing the protected server, which in this case would include the client's domain token that was received from the CDC and the client's service token (containing a session identifier) that was received from the protected server when a session was established between the client and the protected server (step 364). At some later point in time, the client receives from the protected server a service response along with a refreshed service token and possibly a refreshed domain token (step 366). The client stores the updated service token (and updated domain token, if necessary) that it has received from the protected server (step 368), e.g., within a cookie cache. The client then processes any data that has been received as part of the service response (step 370), and the process is complete.

Figure 4A:
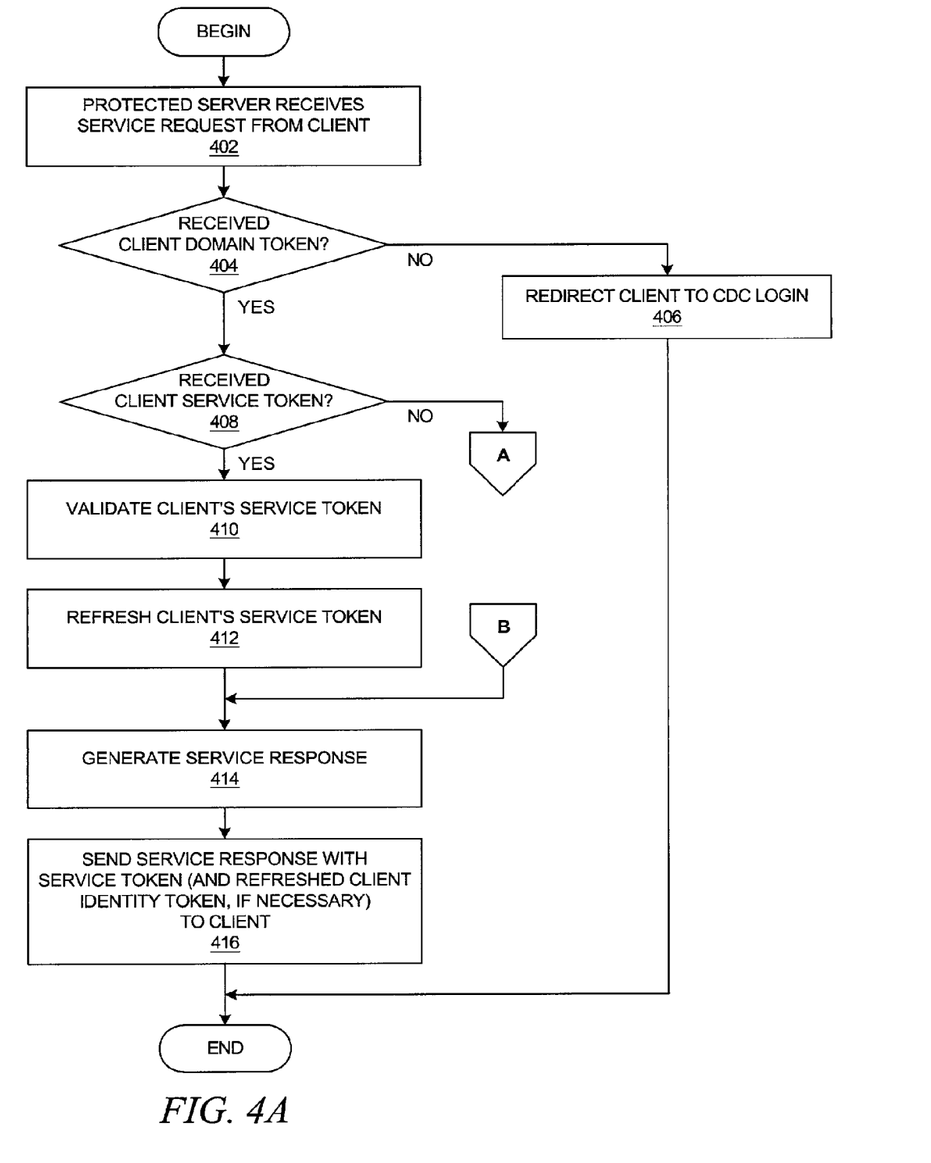
FIGS. 4A-4B are a pair of flowcharts depicting some of the steps in a process through which a protected server provides access to a protected resource at the request of a client in accordance with a preferred embodiment of the present invention.
Figure 4B:
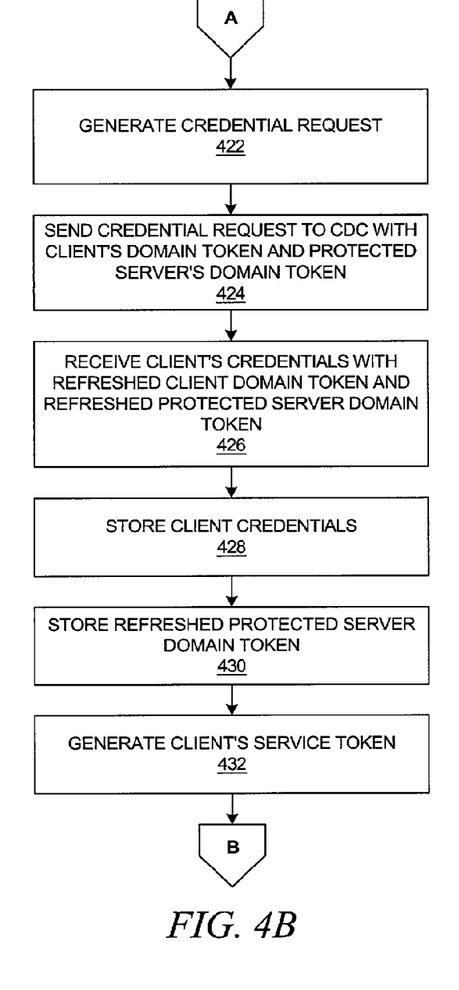

With reference now to FIGS. 4A-4B, a pair of flowcharts depict some of the steps in a process through which a protected server provides access to a protected resource at the request of a client in accordance with a preferred embodiment of the present invention. Referring to FIG. 4A, the process begins with the protected server receiving a service request from a client (step 402). A determination is then made as to whether or not the service request comprises a domain token (step 404). If not, then the client is redirected to perform a login process at a CDC (step 406), after which the CDC will redirect the client to the protected server.

If the service request comprises a domain token, then a determination is made as to whether the service request also comprises a service token (step 408). If so, then the protected server validates the client's service token (step 410), and assuming the validation is successful, the protected server refreshes the client's service token (step 412); the session identifying information in the service token allows the protected server to match the previously established session context with the client and to update or refresh the client's session context, i.e. to perform any necessary session management. In an alternative embodiment, the protected server also sends the client's domain token to the CDC to refresh the client's domain token; in order to do so, the protected server would also send its domain token, which would also be refreshed. In response to the client's service request, the protected server then generates a service response (step 414) and sends the service response with the refreshed service token to the client (step 416), and the process is complete.

If the service request does not comprise a service token as determined at step 408, then process branches to attempt to issue a service token for the client. Referring to FIG. 4B, the protected server generates a credential request (step 422) and sends the credential request to a CDC with the client's domain token and the protected server's domain token (step 424); other secondary authentication information may also be included. Assuming that the CDC successfully authenticates the submitted domain tokens, the protected server receives the client's credentials along with a refreshed client domain token and a refreshed protected server domain token (step 426). The protected server then stores the client's credentials (step 428); the client's credentials comprise authorization information for making access control decisions with respect to protected resources on behalf of the client's service requests.

The protected server then stores its refreshed domain token (step 430) and generates a service token for the client while establishing a session context for the client (step 432). Since this portion of the process is complete, the process branches back to the steps shown in FIG. 4A.

Figure 4C:
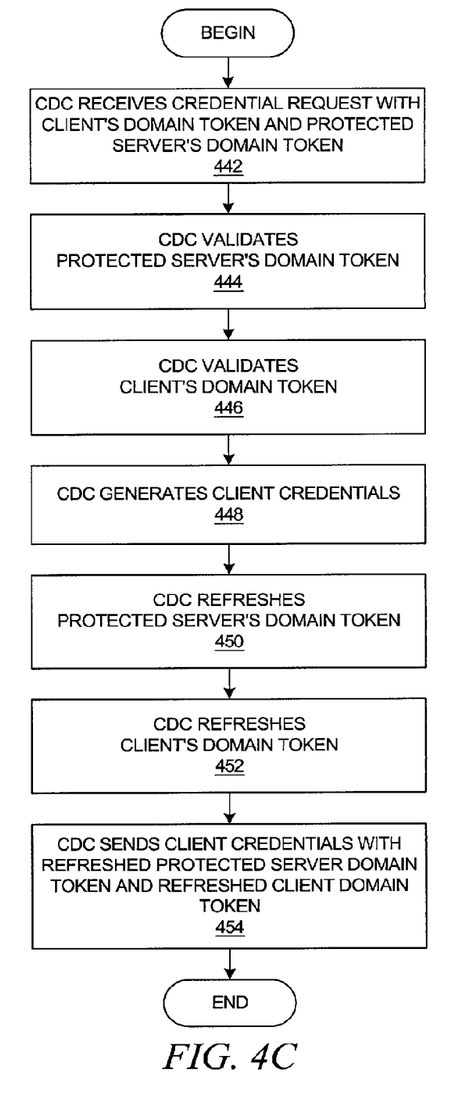
FIG. 4C is a flowchart depicting some of the steps in a process through which a CDC issues client credentials to a protected server that is granting initial access to a protected resource on behalf of a client in accordance with a preferred embodiment of the present invention.

With reference now to FIG. 4C, a flowchart depicts some of the steps in a process through which a CDC issues client credentials to a protected server that is granting initial access to a protected resource on behalf of a client in accordance with a preferred embodiment of the present invention. The process begins with the CDC receiving a credential request along with the client's domain token and the protected server's domain token (step 442). The CDC validates the protected server's domain token (step 444) and validates the client's domain token (step 446), and assuming that the tokens are successfully validated, the CDC generates the client credentials (step 448). The CDC then refreshes the protected server's domain token (step 450) and refreshes the client's domain token (step 452). The CDC sends the client credentials with the refreshed domain tokens to the protected server (step 454), and the process is complete.

The advantages of the present invention should be apparent in view of the detailed description of the invention that is provided above. The present invention provides secure session management using single-use tokens, also termed single-use cookies. After a single-use token has been issued to an entity, it may be presented for use only once, after which the token must be updated or refreshed prior to re-use, thereby causing the token to be essentially reissued upon each use. The single-use token contains a session identifier of some type that allows the token issuer to perform session management with respect to the owner of the token. The present invention is relatively easy to implement because it uses standard Internet-based and Web-based protocols without requiring signed applets or browser plug-ins to support the ongoing use of single-use cookies by a client. Additionally, the present invention is independent of the encryption infrastructure that might be used to support secure communication between the interacting entities.

Through a server-based cookie refresh process, the present invention provides server-based management and control of the client security context. Separate domain cookies and service cookies can be implemented, yet the method is uniform for both clients and protected servers.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for controlling access to protected resources within a distributed data processing system, the method comprising:
   using a processor configured to perform data processing operations;
   receiving at a first server from a client a first single-use domain token associated with said client and a request to access a protected resource;
   validating said single-use domain token;
   generating a client authorization credential request;
   sending to a second server said client authorization credential request, said first single-use domain token, and a second single-use domain token associated with said first server, wherein said first server and said second server are operated within a common domain;
   receiving a single-use service token from said second server, said single-use service token associated with said client;
   processing said single-use service token to generate a response to said request;
   refreshing said single-use service token; and
   providing said response and said refreshed single-use service token to said client.

2. The method of claim 1, wherein said first server:
   refreshes said first single-use domain token; and
   provides said refreshed first single-use domain token to said client.

3. The method of claim 1, wherein said first single-use domain token comprises session information for performing session management with respect to said client.

4. The method of claim 3, wherein said session information comprises a session key.

5. The method of claim 1, further comprising:
   receiving a login request from said client at said second server;
   challenging said client to provide authentication data;
   receiving said authentication data;
   processing said authentication data to authenticate said client;
   generating said first single-use domain token;
   generating an authentication response; and
   providing said authentication response and said first single-use domain token to said client.

6. The method of claim 5, further comprising:
   determining that said login request is a redirected request from said first server; and
   modifying said authentication response to redirect said client to said first server.

7. A system comprising:
   a processor;
   a data bus coupled to the processor; and
   a computer-readable medium embodying computer program code, the computer-readable medium being coupled to the data bus, the computer program code maintaining persistent links to information stored on a network and comprising instructions executable by the processor and configured for:
   using a processor configured to perform data processing operations;
   receiving at a first server from a client a first single-use domain token associated with said client and a request to access a protected resource;
   validating said single-use domain token;
   generating a client authorization credential request;
   sending to a second server said client authorization credential request, said first single-use domain token, and a second single-use domain token associated with said first server, wherein said first server and said second server are operated within a common domain;
   receiving a single-use service token from said second server, said single-use service token associated with said client;
   processing said single-use service token to generate a response to said request;
   refreshing said single-use service token; and
   providing said response and said refreshed single-use service token to said client.

8. The system of claim 7, wherein said first server:
   refreshes said first single-use domain token; and provides said refreshed first single-use domain token to said client.

9. The system of claim 7, wherein said first single-use domain token comprises session information for performing session management with respect to said client.

10. The system of claim 9, wherein said session information comprises a session key.

11. The system of claim 7, further comprising:
receiving a login request from said client at said second server;
challenging said client to provide authentication data;
receiving said authentication data;
processing said authentication data to authenticate said client;
generating said first single-use domain token;
generating an authentication response; and
providing said authentication response and said first single-use domain token to said client.

12. The system of claim 11, further comprising:
determining that said login request is a redirected request from said first server; and
modifying said authentication response to redirect said client to said first server.

13. A computer program product on a non-transitory computer-readable medium embodying computer program code for controlling access to protected resources within a distributed data processing system, the computer program code comprising computer executable instructions configured for:
using a processor configured to perform data processing operations;
receiving at a first server from a client a first single-use domain token associated with said client and a request to access a protected resource;
validating said single-use domain token;
generating a client authorization credential request;
sending to a second server said client authorization credential request, said first single-use domain token, and a second single-use domain token associated with said first server, wherein said first server and said second server are operated within a common domain;
receiving a single-use service token from said second server, said single-use service token associated with said client;
processing said single-use service token to generate a response to said request;
refreshing said single-use service token; and
providing said response and said refreshed single-use service token to said client.

14. The computer-readable medium of claim 13, wherein said first server:
refreshes said first single-use domain token; and
provides said refreshed first single-use domain token to said client.

15. The computer-readable medium of claim 13, wherein said first single-use domain token comprises session information for performing session management with respect to said client.

16. The computer-readable medium of claim 15, wherein said session information comprises a session key.

17. The computer-readable medium of claim 13, further comprising:
receiving a login request from said client at said second server;
challenging said client to provide authentication data;
receiving said authentication data;
processing said authentication data to authenticate said client;
generating said first single-use domain token;
generating an authentication response; and
providing said authentication response and said first single-use domain token to said client.

18. The computer-readable medium of claim 17, further comprising:
determining that said login request is a redirected request from said first server; and
modifying said authentication response to redirect said client to said first server.

19. The computer-readable medium of claim 13, wherein the computer executable instructions are deployable to a client computer from a server at a remote location.

20. The computer-readable medium of claim 13, wherein the computer executable instructions are provided by a server on an on-demand basis.

* * * * *